United States Patent
Shumaker et al.

(10) Patent No.: US 11,858,480 B2
(45) Date of Patent: Jan. 2, 2024

(54) READY MIX TRUCK WASH SYSTEM

(71) Applicant: Shumaker Industries, Inc., Northumberland, PA (US)

(72) Inventors: Brett Shumaker, Northumberland, PA (US); Kenneth Kremser, Danville, PA (US); Drew Streit, Bloomsburg, PA (US); John Facer, Winfield, PA (US); Jared Facer, Lewisburg, PA (US); Benjamin Bitting, Danville, PA (US)

(73) Assignee: Shumaker Industries, Inc., Northumberland, PA (US)

( * ) Notice: Subject to any disclaimer, the term of this patent is extended or adjusted under 35 U.S.C. 154(b) by 697 days.

(21) Appl. No.: 16/739,216

(22) Filed: Jan. 10, 2020

(65) Prior Publication Data

US 2020/0223402 A1 Jul. 16, 2020

Related U.S. Application Data

(60) Provisional application No. 62/790,710, filed on Jan. 10, 2019.

(51) Int. Cl.
*B60S 3/04* (2006.01)
*B08B 3/02* (2006.01)
(Continued)

(52) U.S. Cl.
CPC ............... *B60S 3/04* (2013.01); *B08B 3/022* (2013.01); *B08B 2209/08* (2013.01); *G05D 1/0225* (2013.01); *G08G 1/095* (2013.01)

(58) Field of Classification Search
CPC .... B60S 3/00; B60S 3/006; B60S 3/04; B60S 3/06; B60S 3/063; B60S 3/066; B08B 3/02; B08B 3/022; B08B 9/08; B08B 9/093
See application file for complete search history.

(56) References Cited

U.S. PATENT DOCUMENTS 4,225,881 A * 9/1980 Tovi ................... G08B 13/1963
                                                   348/374
8,418,702 B2   4/2013 Brand
                        (Continued)

FOREIGN PATENT DOCUMENTS

ES          2265790 B1 * 12/2007 ........... B08B 9/0936

OTHER PUBLICATIONS

Machine Translation of Ferret et al., ES-2265790-B1, Dec. 2007. (Year: 2007).*

*Primary Examiner* — David G Cormier
(74) *Attorney, Agent, or Firm* — McNees Wallace & Nurick

(57) ABSTRACT

A ready mix truck wash system includes a frame adapted for receiving a ready mix truck during operation of the system, a plurality of nozzles supported at predetermined positions by the frame to direct a pressurized liquid for washing the ready mix truck, a controller, and a plurality of sensors controlled by the controller for monitoring a position of the ready mix truck relative to at least one of the frame and the plurality of nozzles in preparation of operation and during operation of the system. In response to the ready mix truck being temporarily positioned at a first fixed position during operation of the system, a controlled predetermined volume of pressurized liquid is introduced into a barrel of the ready mix truck from at least one nozzle of the plurality of nozzles, the predetermined volume of pressurized liquid mixing with a concrete load in the ready mix truck.

19 Claims, 14 Drawing Sheets

(51) Int. Cl.
  *G05D 1/02* (2020.01)
  *G08G 1/095* (2006.01)

(56) References Cited

U.S. PATENT DOCUMENTS

| | | | |
|---|---|---|---|
| 10,130,164 B2* | 11/2018 | Simpson | A46B 13/003 |
| 2005/0174879 A1* | 8/2005 | Bentley | B28C 7/12 |
| | | | 366/16 |
| 2008/0135334 A1* | 6/2008 | Graham | B66F 7/28 |
| | | | 182/141 |
| 2008/0190465 A1* | 8/2008 | Medinis | B60S 3/04 |
| | | | 134/123 |
| 2017/0152877 A1* | 6/2017 | Tomas Puchades | B60S 3/04 |
| 2017/0337815 A1* | 11/2017 | Reed, III | B60S 3/04 |

* cited by examiner

READY MIX TRUCK WASH SYSTEM

FIELD OF THE INVENTION

The present invention is directed to systems and methods for washing vehicles, and, in particular, to systems and methods for washing ready mix trucks.

BACKGROUND OF THE INVENTION

In the concrete business, it is necessary to wash ready mix trucks on a regular basis. After both loading and unloading, trucks should be thoroughly washed in order to remove any material accumulated on the exterior surface. Conventionally, as shown in FIG. 1, an individual 14, typically a driver of ready mix truck 12, must be provided access, such as a ladder system mounted to ready mix truck 12 or a freestanding support 18 to wash ready mix truck 12 with a stream of water 22 directed through a hose 20. There are several disadvantages associated with this approach to wash ready mix trucks, including possible injury to individual 14, the time involved to wash ready mix truck 12, the amount of water expended, and lack of consistency as to the quality of the washing job performed by individual 14. Moreover, during the washing process, the amount of water 22 utilized to wash a feed hopper 24 also referred to as a loading hopper or charging hopper may vary widely, similarly adversely affecting the quality of the concrete contained in ready mix truck 12. This is because an uncontrolled amount of water 22 utilized to wash the inside surface of feed hopper 24 leading to the interior of barrel 26 or drum of ready mix truck 12 is introduced into a barrel 26 or drum and mixes with the load of concrete. "Slump" is a measure of consistency of freshly mixed concrete, as determined by the distance the concrete slumps or spreads outwardly onto a surface after a molded specimen is removed from an inverted funnel-shaped cone. In certain applications, such as road construction, if the slump falls outside of an acceptable range, the load of concrete is rejected, resulting in waste of time and materials. A conventional hose 20 utilized to wash ready mix trucks has a flow rate of 1-2 gallons/second, and the addition of as little as 5 gallons of water to a concrete load may be sufficient to result in the load of concrete being rejected (i.e., only 2.5 seconds of water flow directed into the feed hopper).

In order to address shortcomings in the industry, U.S. Pat. No. 8,418,702, directed to a ready mix truck wash system, utilizes multiple nozzles that are directed to wash a ready mix truck in timed stages, as the ready mix truck is slowly driven through the truck wash. While this truck wash system effectively addressed many of the industry shortcomings, there is no provision to control the amount of water introduced into the barrel of the ready mix truck which would then mix with the load of concrete.

Conventional vehicle wash systems, which typically utilize timed stages to wash a vehicle that is located at a predetermined position by moving machinery relative to the vehicle, or by conveying the vehicle along a track through the vehicle wash, also lack provisions to control the amount of water applied to only a specific portion of the vehicle, as the objective is to uniformly apply water over the entire vehicle in order to wash the vehicle.

There is a need in the art for a ready mix truck wash systems and method that consistently controls the amount of water introduced into the barrel of the ready mix truck.

SUMMARY OF THE INVENTION

In one embodiment, a ready mix truck wash system includes a frame adapted for receiving a ready mix truck during operation of the system, a plurality of nozzles supported at predetermined positions by the frame to direct a pressurized liquid for washing the ready mix truck, a controller, and a plurality of sensors controlled by the controller for monitoring a position of the ready mix truck relative to at least one of the frame and the plurality of nozzles in preparation of operation and during operation of the system. In response to the ready mix truck being temporarily positioned at a first fixed position during operation of the system, a controlled predetermined volume of pressurized liquid is introduced into a barrel of the ready mix truck from at least one nozzle of the plurality of nozzles, the predetermined volume of pressurized liquid mixing with a concrete load in the ready mix truck.

In another embodiment, a ready mix truck wash system includes a frame adapted for receiving a ready mix truck during operation of the system, the frame including a plurality of corresponding frame members movable between a collapsed position and an extended position, a plurality of nozzles supported at predetermined positions by the frame to direct a pressurized liquid for washing the ready mix truck, a controller, and a plurality of sensors controlled by the controller for monitoring a position of the ready mix truck relative to at least one of the frame and the plurality of nozzles in preparation of operation and during operation of the system. In response to the ready mix truck being temporarily positioned at a first fixed position during operation of the system, a controlled predetermined volume of pressurized liquid is introduced into a barrel of the ready mix truck from the plurality of nozzles, the predetermined volume of pressurized liquid mixing with a concrete load in the ready mix truck.

In a further embodiment, a method of washing a ready mix truck includes providing a frame adapted for receiving a ready mix truck, a plurality of nozzles supported at predetermined positions by the frame to direct a pressurized liquid for washing the ready mix truck. The method further includes sensing a position of the ready mix truck relative to the frame and the plurality of nozzles, and communicating with a driver of the ready mix truck for positioning the ready mix truck at a first position. The method further includes communicating with the driver of the ready mix truck for moving the ready mix truck from the first position toward a second position. The method further includes actuating a first portion of the plurality of nozzles to commence washing the ready mix truck as the ready mix truck moves from the first position toward the second position controller. The method further includes communicating with the driver of the ready mix truck to stop at the second position. The method further includes actuating a second portion of the plurality of nozzles to commence washing the ready mix truck at the second position, only the second portion of the plurality of nozzles introducing a controlled predetermined volume of pressurized liquid into a barrel of the ready mix truck mixing with a concrete load in the ready mix truck. The method further includes communicating with the driver of the ready mix truck to move from the second position toward a third position away from the frame. The method further includes actuating a third portion of the plurality of nozzles to finish washing the ready mix truck.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
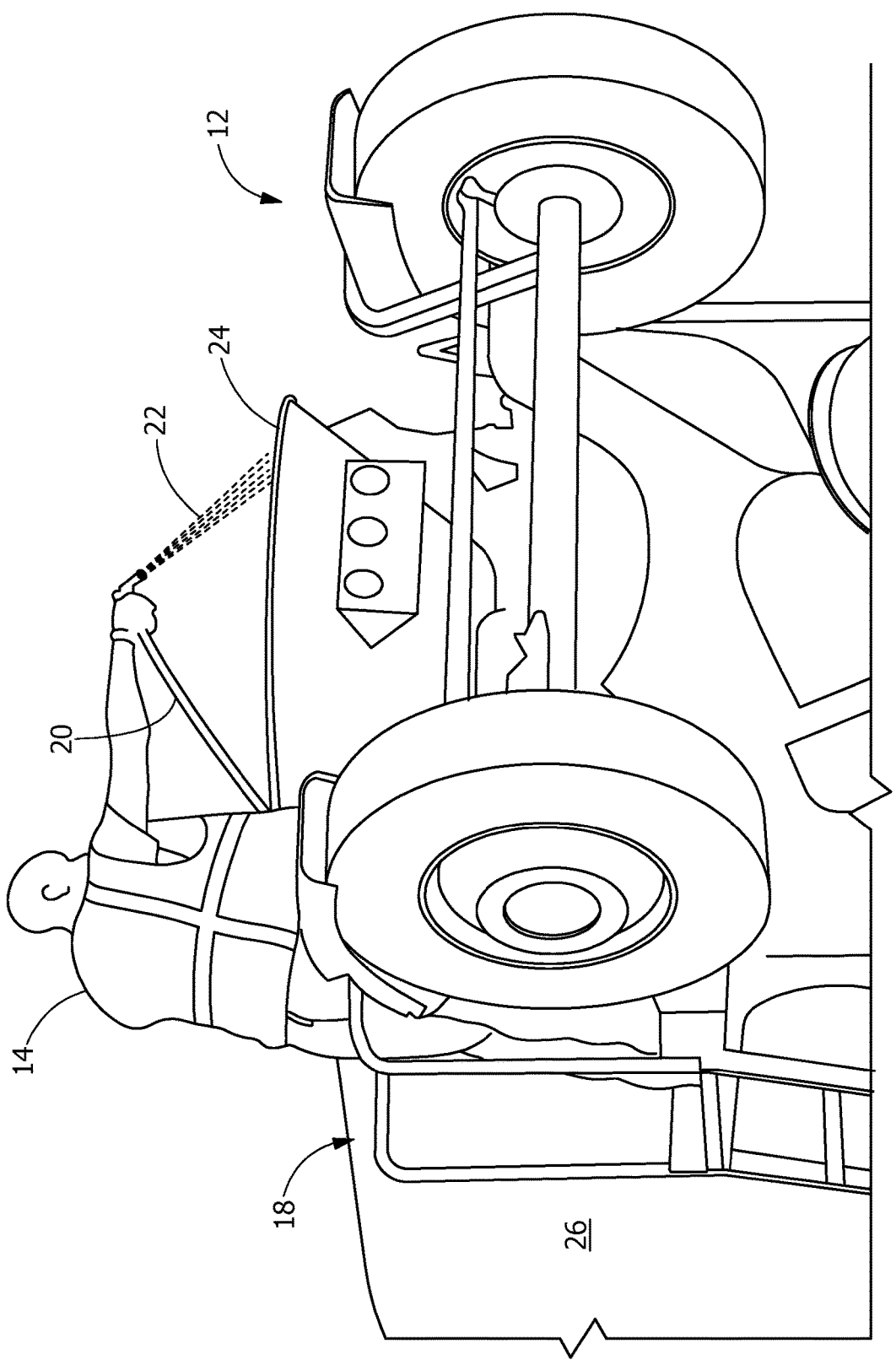
FIG. 1 is a prior art arrangement for washing ready mix trucks.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
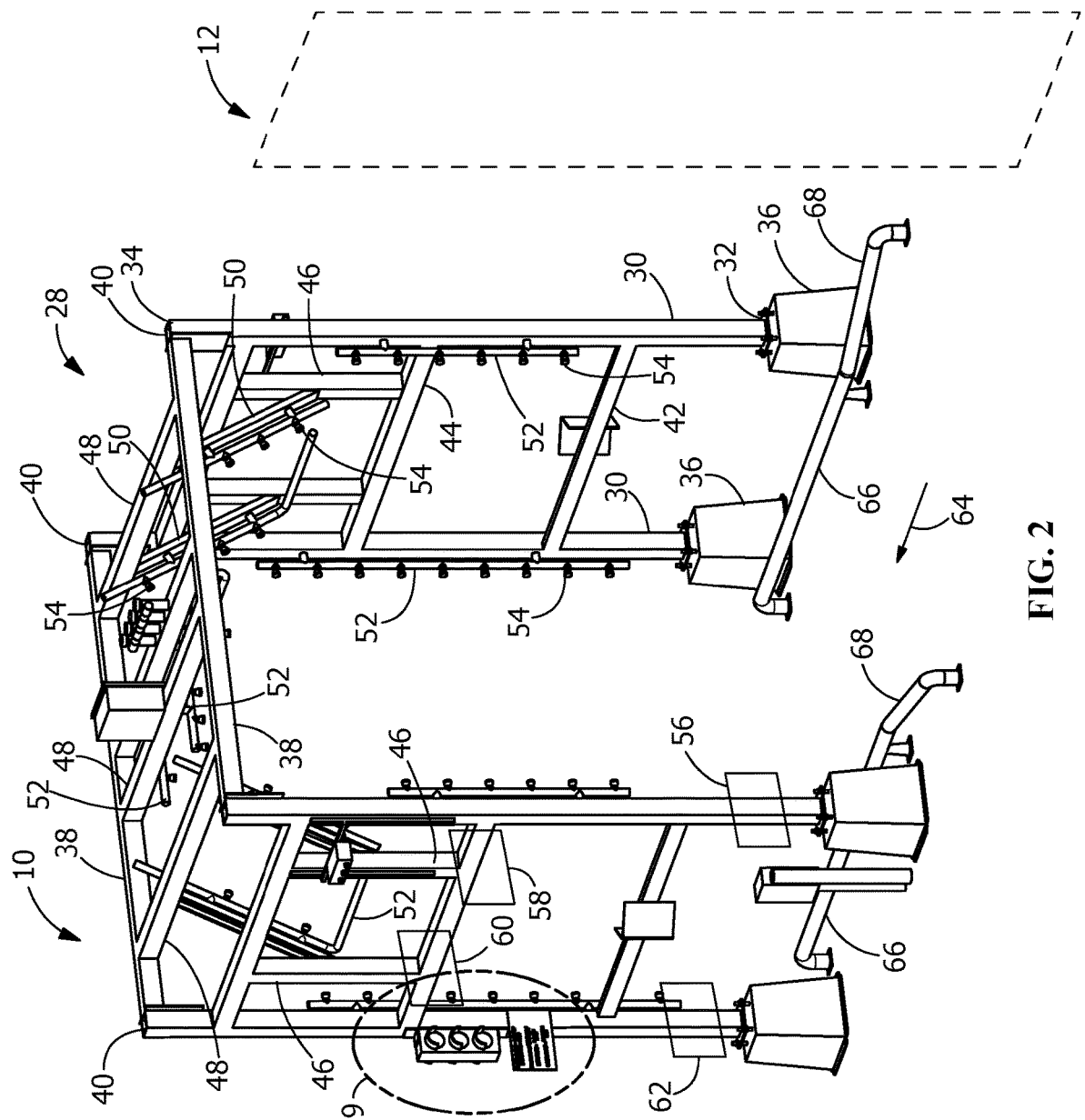
FIG. 2 is a perspective view of an exemplary ready mix truck wash system.
Figure 3:
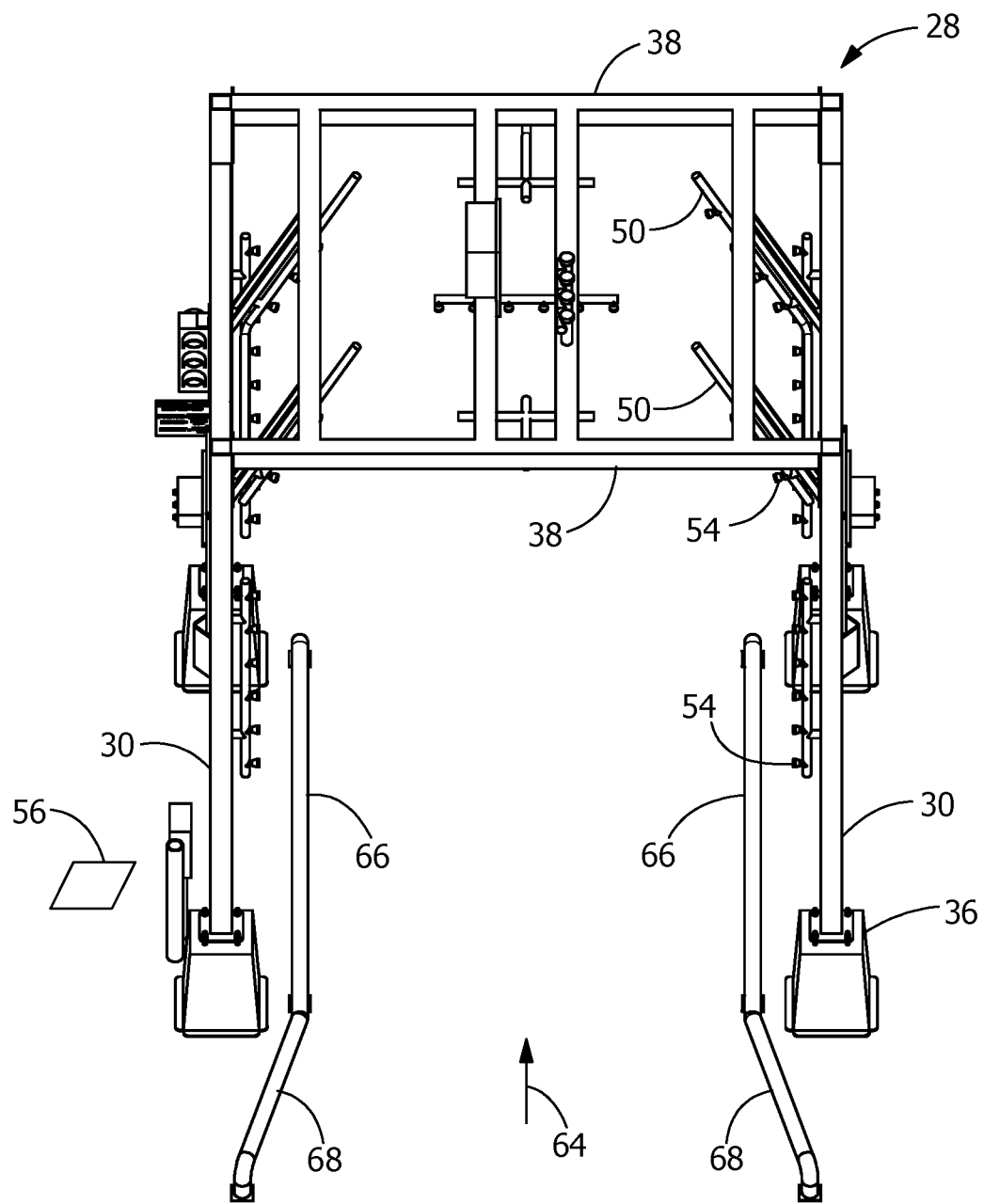
FIG. 3 is an angled top view of the mix truck wash system of FIG. 2.
Figure 10A:
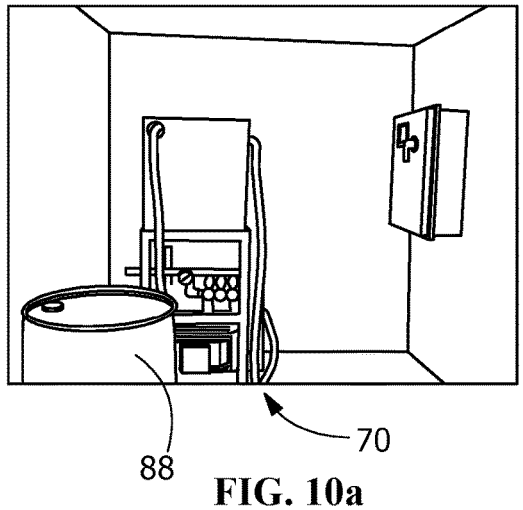
FIG. 10a is a perspective view of a holding tank and pump.
Figure 15:
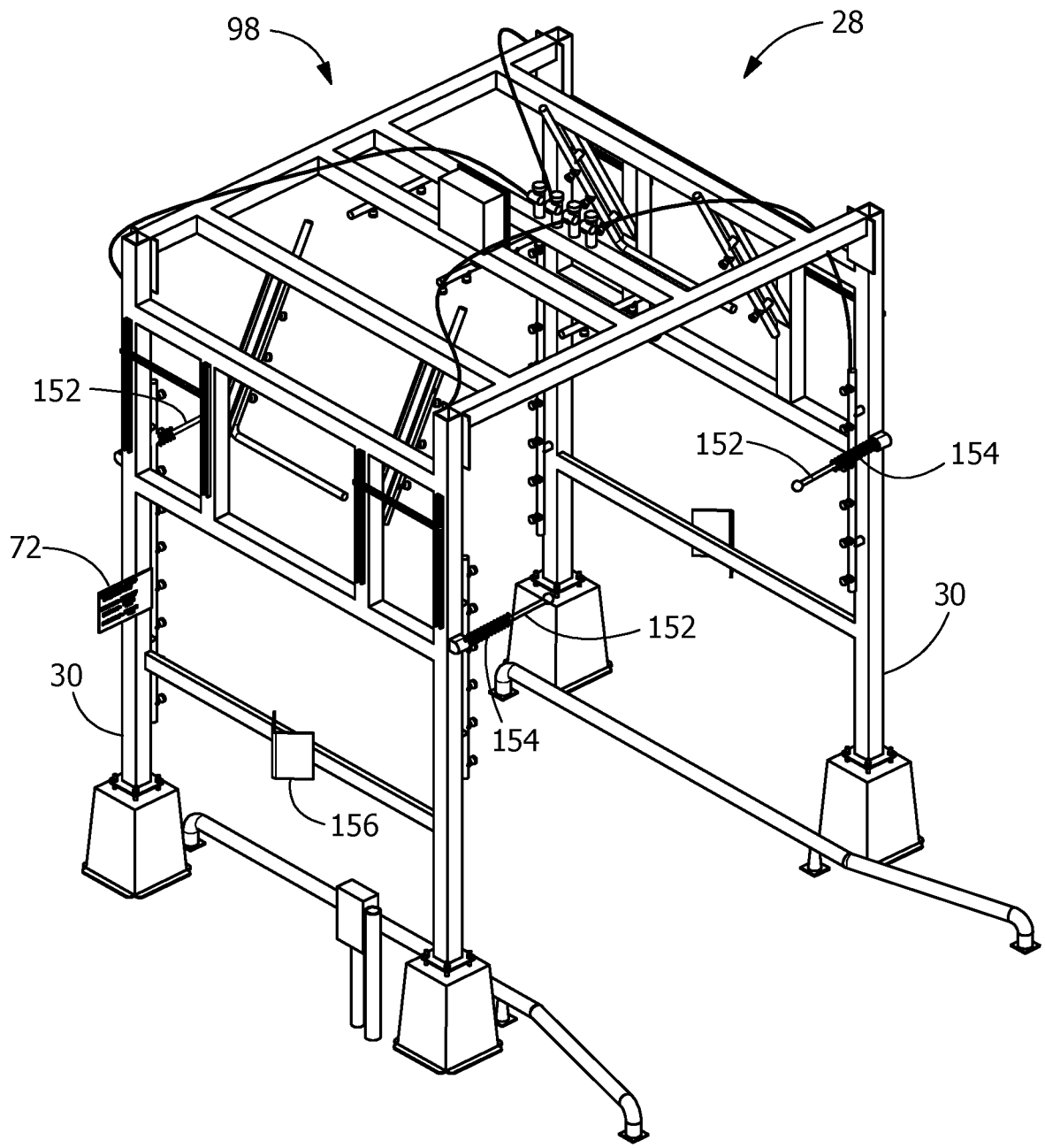
FIG. 15 is a perspective view of an exemplary ready mix truck wash system.

As shown in FIG. 2, an exemplary ready mix truck wash system 10 comprises an open interconnected frame 28 resembling an inverted "U" including a plurality of vertically extending members 30 such as tubes having opposed ends 32, 34, with ends 32 connecting to corresponding bases 36 and ends 34 connecting to corresponding ends 40 of horizontally extending members 38. Other members 42, 44, 46, 48, 50 interconnect to one or more of members 30, 38 and/or to one another to define a frame 28. Nozzles 54 are positioned at predetermined locations of tubes 52 that generally extend along and are supported by members 30, 38, 44, 46, 48, 50 and direct a pressurized liquid, such as water drawn from a holding tank via a pump 70 (FIG. 10a) for washing a ready mix truck. In one embodiment, one or more tubes 52 may be flexible. In one embodiment, at least a portion of the water may be conveyed directly through nozzles 54 positioned at predetermined locations of one or more of members 30, 38, 42, 44, 46, 48, 50. Additionally, tubes 52 may also be cantilevered at an angle away from one or more of members 30, 38, 44, 46, 48, 50, such as away from member 48 positioned approximately mid span at the top of frame 28. As further shown in FIG. 2, clusters of nozzles 54 may be positioned in each of parallel planes 56, 58, 60, 62 that are mutually perpendicular to a travel direction 64 of ready mix truck 12 (FIG. 4) relative to frame 28. These clusters of nozzles 54 generally define spray arches of pressurized liquid applied to the outside surface of a ready mix truck 12 (FIG. 4) for washing the ready mix truck 12. In order to generally center ready mix truck 12 (FIG. 4) moving parallel to travel direction 64 during operation of ready mix truck wash system 10, optional opposed guides 66 extend generally parallel to travel direction 64, with converging guide portions 68 positioned near plane 56 of frame 28 to help initially guide ready mix truck 12 (FIG. 4) under frame 28. Optionally, as shown in FIG. 15, members 152 extend inwardly from frame 28, such as from members 30 may include a spring 154 that permits member 152 to resiliently deflect away from an extended position as a result of rubbing against a portion of the ready mix truck 12 (FIG. 5), such as a side mirror (not shown) when the ready mix truck 12 is not sufficiently centered in frame 28. In response, the driver can reverse direction and properly realign (i.e., "center") the ready mix truck 12 relative to frame 28 without damaging either the frame 28 or the ready mix truck 12. Operation of components and an exemplary structural arrangement is discussed in further detail on U.S. Pat. No. 8,418,702, which is hereby incorporated by reference in its entirety.

For purposes herein, the term "ready mix truck" and the like is meant generally and includes any vehicle used in the construction concrete industries.

It is to be understood that the ready mix truck wash system of the present invention may be adapted for use with numerous ready mix truck designs, such as front or rear loading.

Figure 4:
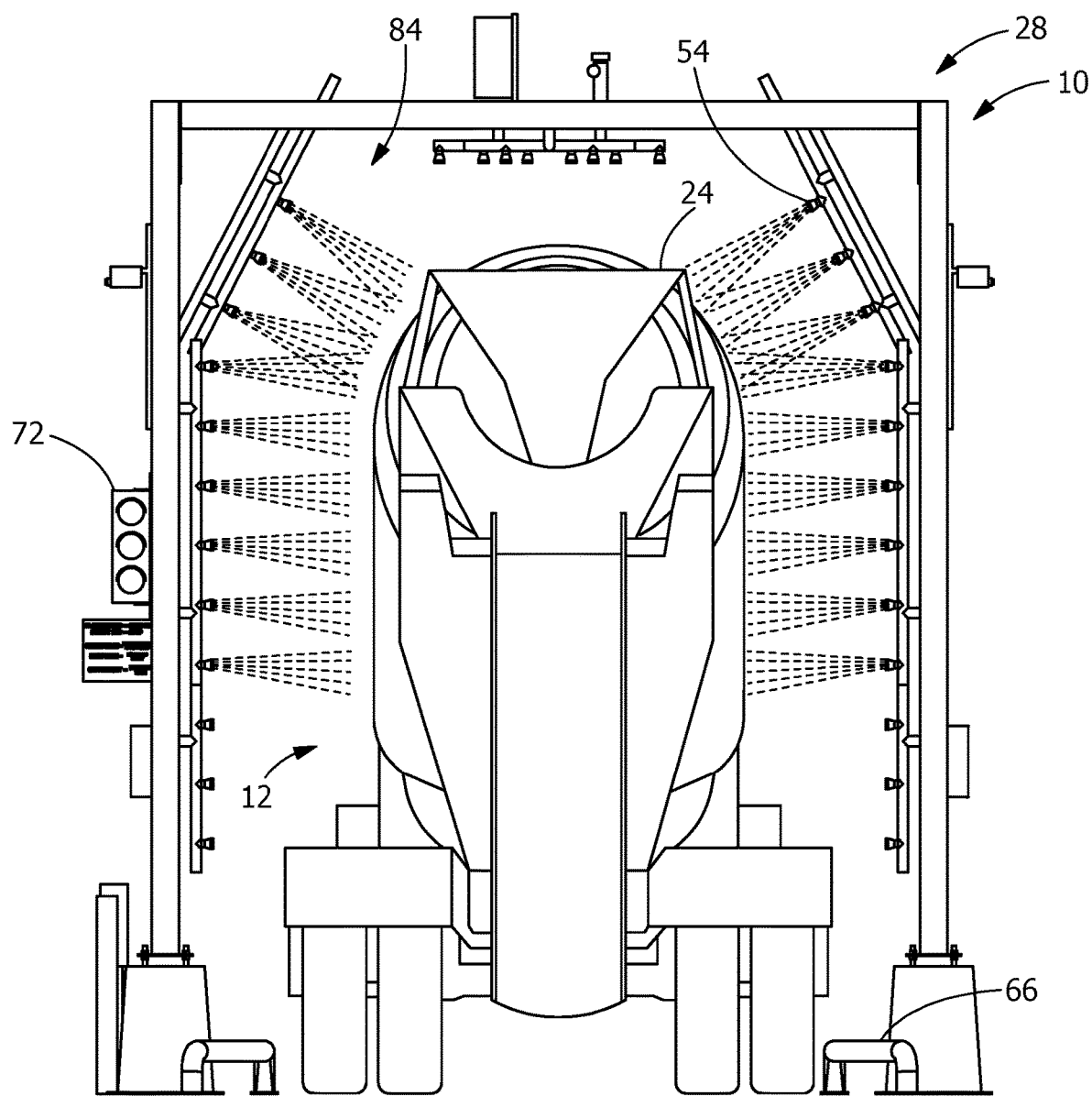
FIG. 4 is an end view of an exemplary stage of the ready mix truck wash system of FIG. 2.
Figure 8:
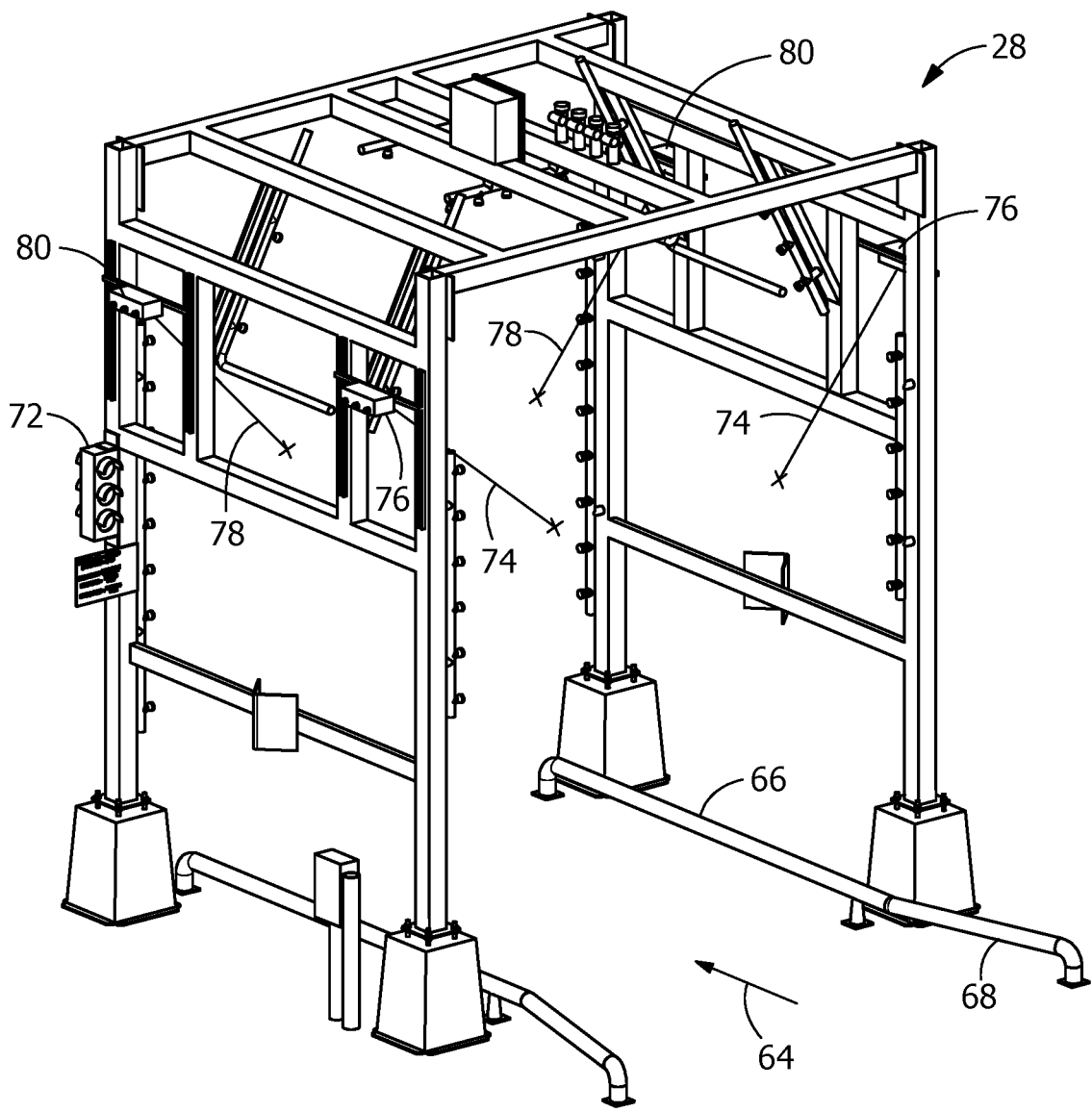
FIG. 8 is a perspective view of an exemplary ready mix truck wash system.
Figure 9:
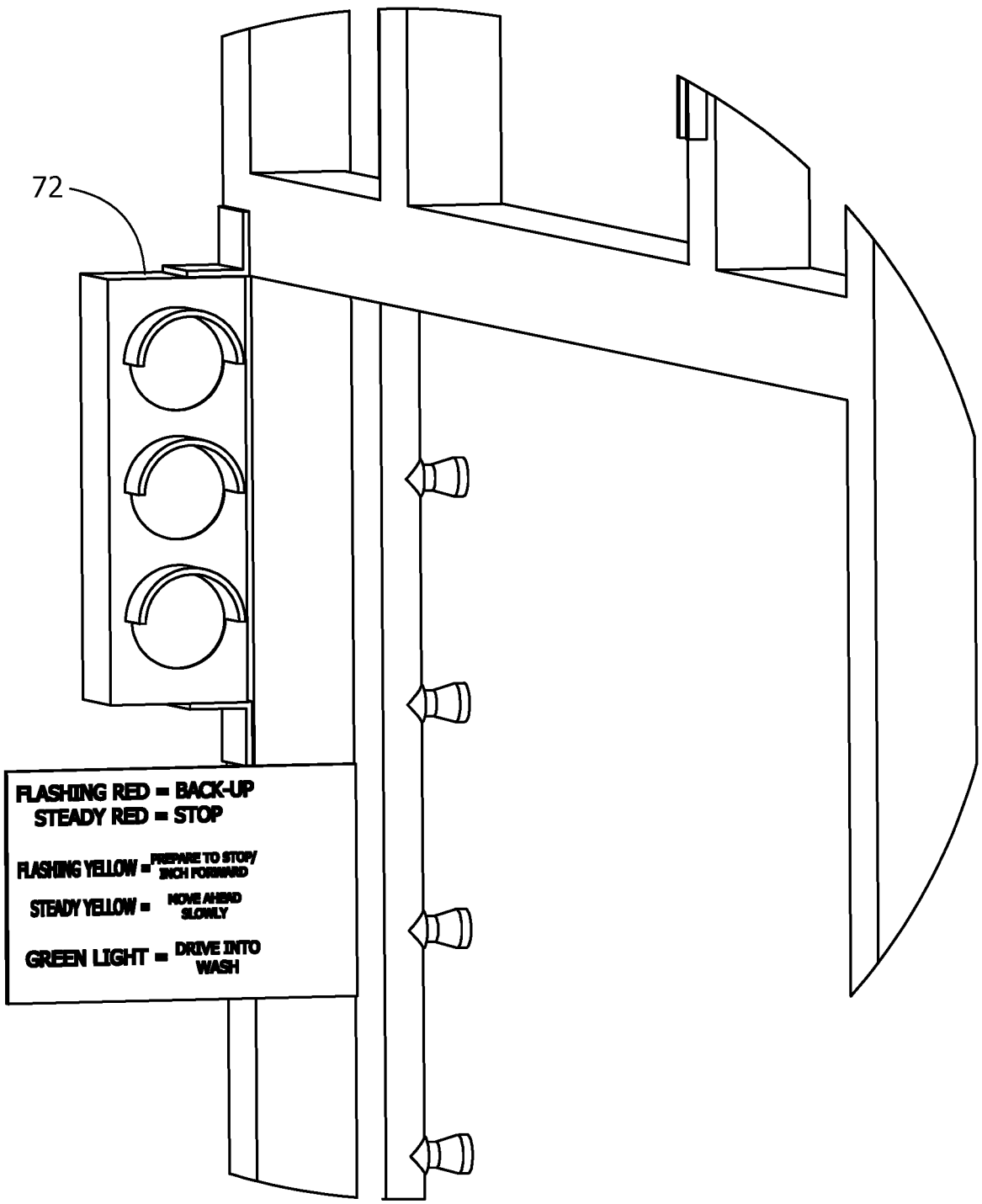
FIG. 9 is a reverse perspective view taken from a region 9 of the ready mix truck wash system of FIG. 2.
Figure 10B:
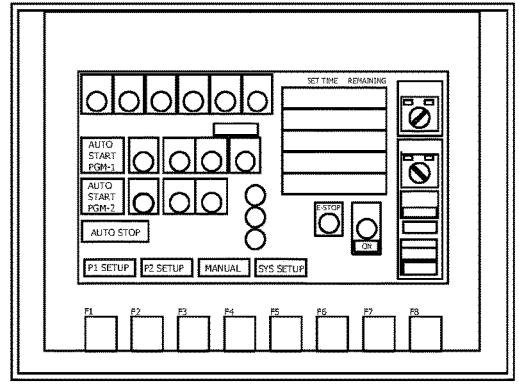
FIG. 10b is a plan view of an exemplary display of the ready mix truck wash system.

FIGS. 4, 5, 5a, 6 and 7 show different stages of operation of ready mix truck wash system 10. Frame 28 includes an indicator 72 (FIGS. 4 and 9) similar to a conventional traffic light containing green, yellow and red lights. As shown in FIG. 15, instruction panel 156 provides instructions associated with indicator 72. For example, when the green light is displayed, ready mix truck wash system 10 is ready for use. In response to ready mix truck 12 (FIG. 4) moving sufficiently in travel direction 64 (FIG. 8) such that ready mix truck 12 is in sufficient proximity so as to be detected such as by breaking (e.g., breaking the sight line of) respective beams 74 (FIG. 8) of sensors 76, sometimes referred to as proximity sensors or "electric eyes," as shown in FIG. 4, the yellow light of indicator 72 is illuminated, and a first stage spray arch 84 of pressurized liquid is applied through nozzles 54 to the outside surface of ready mix truck 12. First stage spray arch 84, which may be applied coincident with one or more of planes 56, 58, 60, 62 (FIG. 2) or other directed arrangement(s) of nozzles 54 specifically does NOT direct water into hopper 24, but is instead, for example, intended to wash other portions of the outside surface of the ready mix truck 12, such as the cab and windshield. In response to sufficient additional movement of ready mix truck 12 (FIG. 4) in travel direction 64 (FIG. 8) such that ready mix truck 12 is in sufficient proximity so as to be detected such as by breaking respective beams 78 (FIG. 8) of sensors 80, sometimes referred to as proximity sensors or "electric eyes," or a laser, a controller 86 (FIG. 10b) deactivates pump 70 (FIG. 10a), thereby shutting off first stage spray arch 84 (FIG. 4) of pressurized liquid being applied to the outside surface of ready mix truck 12.

It is to be understood that the controller controls operation of the sensors, the pump, the indicator and other components of the system in a known manner that is not further discussed herein.

It is to be understood that the sensors are adapted to detect conditions such as the ready mix truck being out of position in a manner that could lead to a collision or inadvertent contact or damage the system, including the possibility that a differently configured ready mix truck, for example, having dimensions too large to be accommodated by the frame of the system (vertically or laterally), such as inadvertently not removing an attachment protruding from the ready mix truck or failing to return a component to its retracted position, such as the hopper, leading to the possibility of shut-down of operation of the system, preceded by appropriate indications by the indicator, which may include, for example, flashing lights and/or audio alarm, to the driver of the ready mix truck in an effort to avoid damage to the system or the ready mix truck.

Figure 5:
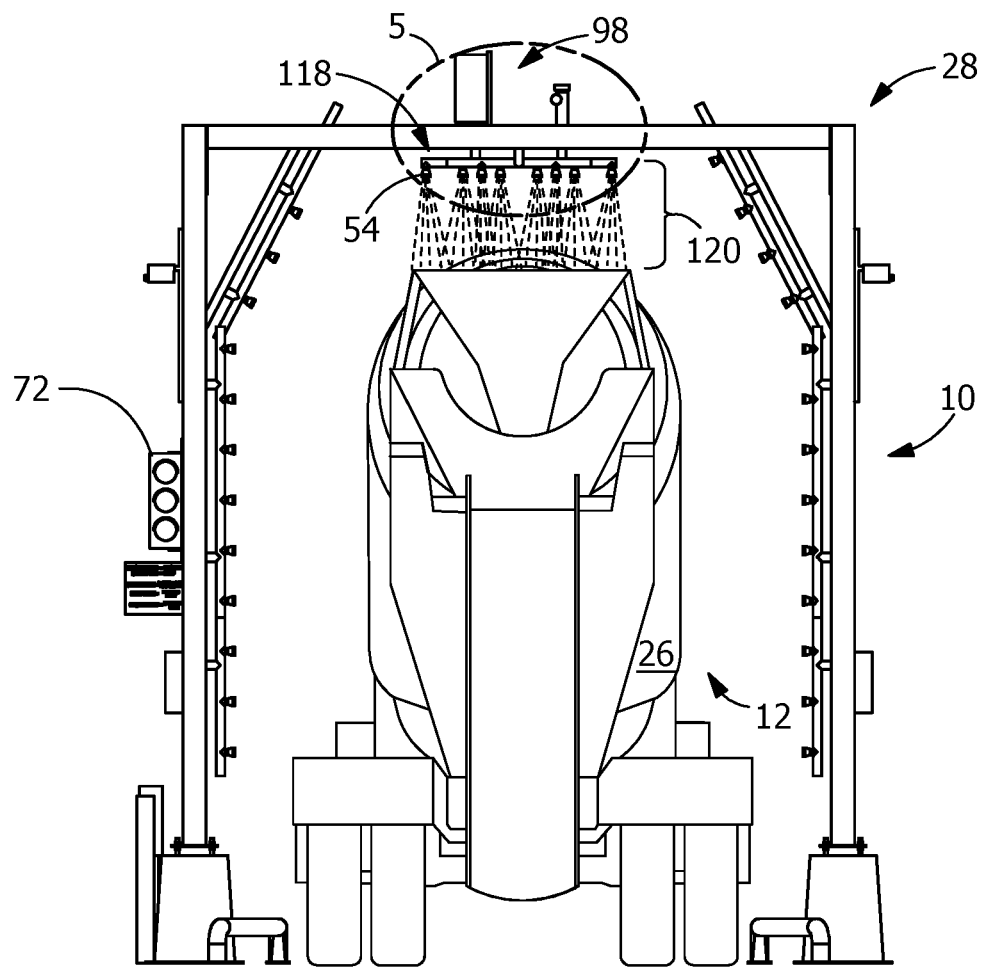
FIG. 5 is an end view of an exemplary stage of the ready mix truck wash system of FIG. 2.
Figure 5A:
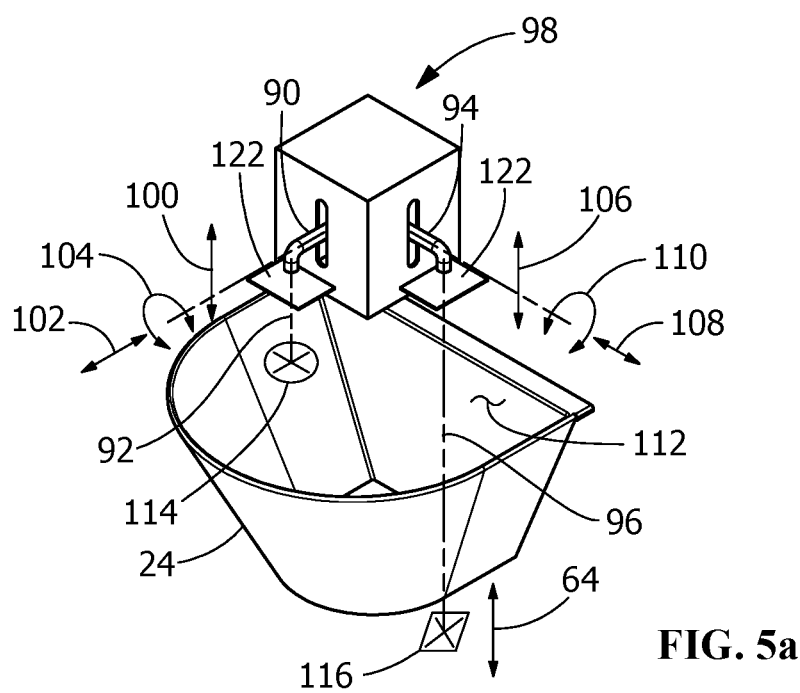
FIG. 5a is a partial perspective view of an exemplary feed hopper of a ready mix truck taken from region 5 of the ready mix truck wash system of FIG. 5.
Figure 5B:
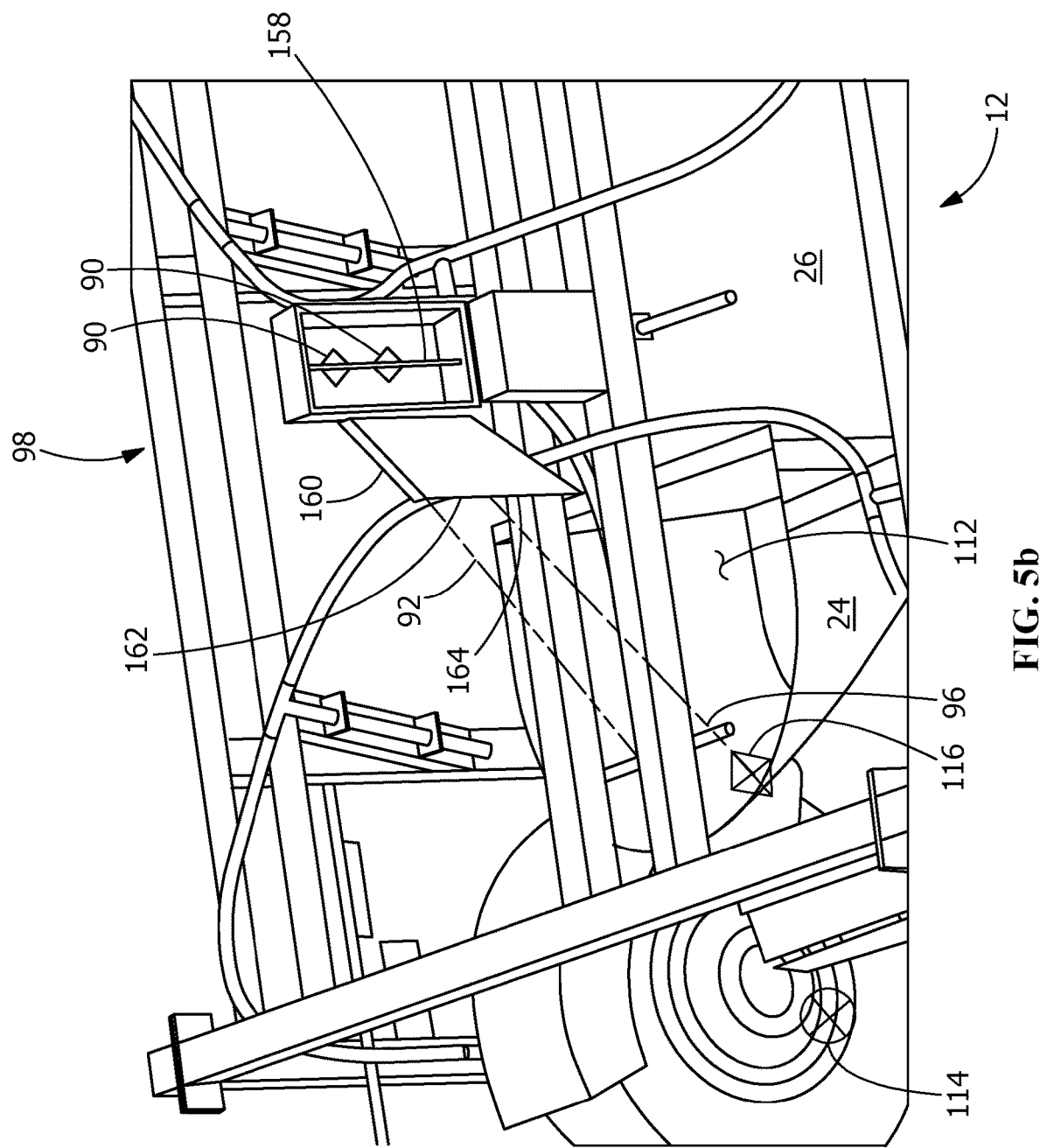
FIG. 5b is a partial perspective view of an exemplary feed hopper of a ready mix truck taken from region 5 of the ready mix truck wash system of FIG. 5.

In one embodiment, as shown in FIG. 5b, which is similar to FIG. 5a further discussed below, sensors 90 are at least partially enclosed in support 98. Optionally, sensors are totally enclosed within support 98 (door panel not shown in FIG. 5b). As shown, support 98 includes a support member 158, permitting sensors to be movingly positioned therealong, permitting adjustment of the direction of the beams 92, 96, such as by permitting sensors 90 to be rotatably movable relative to the axis of support member 158. As further shown, a narrow beam guide 160 secured to support 98 permits the beams 92, 96 emitted by sensors 90 to extend uninterrupted through an opening 162 formed in beam guide 160, providing protection of sensors 90 from pressurized water and/or dirt or concrete load loosened by nozzles 54 of the ready mix truck wash system. In one embodiment, one or both ends of beam guide 160 is covered by a protective barrier 164 composed of materials that do not interrupt the beams 92, 96 emitted from respective sensors 90, 94.

For purposes herein, the terms "sensors," or "proximity sensors" or "electric eyes" are intended to refer to non-contact devices capable of detecting, within a predetermined distance range, the presence of an object "activated condition" (i.e., the object breaking/reflecting the emitted sensor beam) or the non-presence "deactivated condition" (i.e., absence of the object breaking/reflecting the emitted sensor beam). Examples of such "sensors" may include capacitive, eddy-current, inductive, magnetic, including magnetic proximity fuse, optical photoelectric, photocell (reflective), laser, passive (such as charge-coupled devices), passive thermal infrared, radar, reflection of ionizing radiation, sonar (typically active or passive), ultrasonic, fiber optics, and Hall effect.

Returning to FIGS. 5 and 5a, typically subsequent to shutting off first stage spray arch 84 (FIG. 4), as ready mix truck 12 moves further along travel direction 64 (FIG. 8), at least a pair of sensors 90, 94 such as laser sensors are movably secured to a support 98 positioned along the top of frame 28 of ready mix truck wash system 10 for positioning ready mix truck 12 relative to frame 28. Sensor 90 is movably positioned relative to support 98 in at least axial movement directions 100, 102 and rotational movement directions 104. Sensor 94 is movably positioned relative to support 98 in at least axial movement directions 106, 108 and rotational movement directions 110. Sensors 90, 94 are activated only within a predetermined range, meaning that only if an object is positioned outside that predetermined range, e.g., fails to break the respective beams 92, 96, sensors 90, 94 remain deactivated. Sensors 90, 94 are controlled by controller 86 (FIG. 10b) in a known manner such that when sensor 90 is activated as a result of beam 92 being interrupted (indicated as interrupted beam 114) by an inside surface 112 of feed hopper 24, and sensor 94 being simultaneously uninterrupted (i.e., beam 96 (indicated as uninterrupted beam 116 as a result of not being interrupted by feed hopper 24)), the red light of indicator 72 is illuminated, indicating that feed hopper 24 is positioned under a cluster 118 of nozzles 54. In response to red light of indicator 72 being illuminated, the driver of the ready mix truck 12 applies the brakes to the ready mix truck 12. In case of over-travel of ready mix truck 12 relative to cluster 118 of nozzles 54, (sensors 90, 94 being moved relative to feed hopper 24 sufficiently to change the respective interrupted/ uninterrupted status of sensors 90, 94), the red light of indicator 72 is caused to "blink," requiring the driver to reverse travel direction 64, the driver again applying the brakes to stop ready mix truck 12, at least temporarily, when the red light is "solid," i.e., no longer blinking.

As further shown in FIGS. 5 and 5a, in response to ready mix truck 12 remaining in position for a predetermined time period such as three seconds, controller 86 (FIG. 10b) opens a solenoid valve (not shown) to permit pump 70 (FIG. 10a) to direct pressurized water to flow through cluster 118 of nozzles 54, defining second stage spray arch 120. In one embodiment, pump 70 remains on during the operation of the truck wash system. Substantially all of the pressurized water of second stage spray arch 120 is directed onto inside surface 112 of feed hopper 24 and flows into barrel 26 or drum of ready mix truck 12, thereby mixing with the concrete load. Controller 86 (FIG. 10b) closes the solenoid valve (not shown) to pump 70 (FIG. 10a) after operating for a predetermined time period such as 10 seconds, thereby shutting off flow of second stage spray arch 120. As a result of nozzles 54 (FIG. 5) having orifice sizes restricting water flow at a predetermined water pressure, pump 70 (FIG. 10a) delivers the pressurized water through the nozzles 54 of second stage spray arch 120 at a known flow rate, such as 45 gallons/minute and operating for a tightly controlled predetermined time, such as 10 seconds, the amount of water introduced into the concrete load, 7.5 gallons in this case, may be very closely controlled, e.g., 0.5 gallons, or less of deviation. Therefore, by withholding the desired amount of liquid (e.g., 7.5 gallons) in the concrete load initially loaded into the ready mix truck 12, the desired amount of liquid is contained in the concrete load after washing the ready mix truck. As shown, protective barriers 122 are provided to protect sensors 90, 94, from any combination of second stage spray arch 120 and/or concrete to be cleaned from inside surface 112 of feed hopper 24. Protective barriers 122 are composed of materials that do not interrupt the beams 92, 96 emitted from respective sensors 90, 94.

Figure 6:
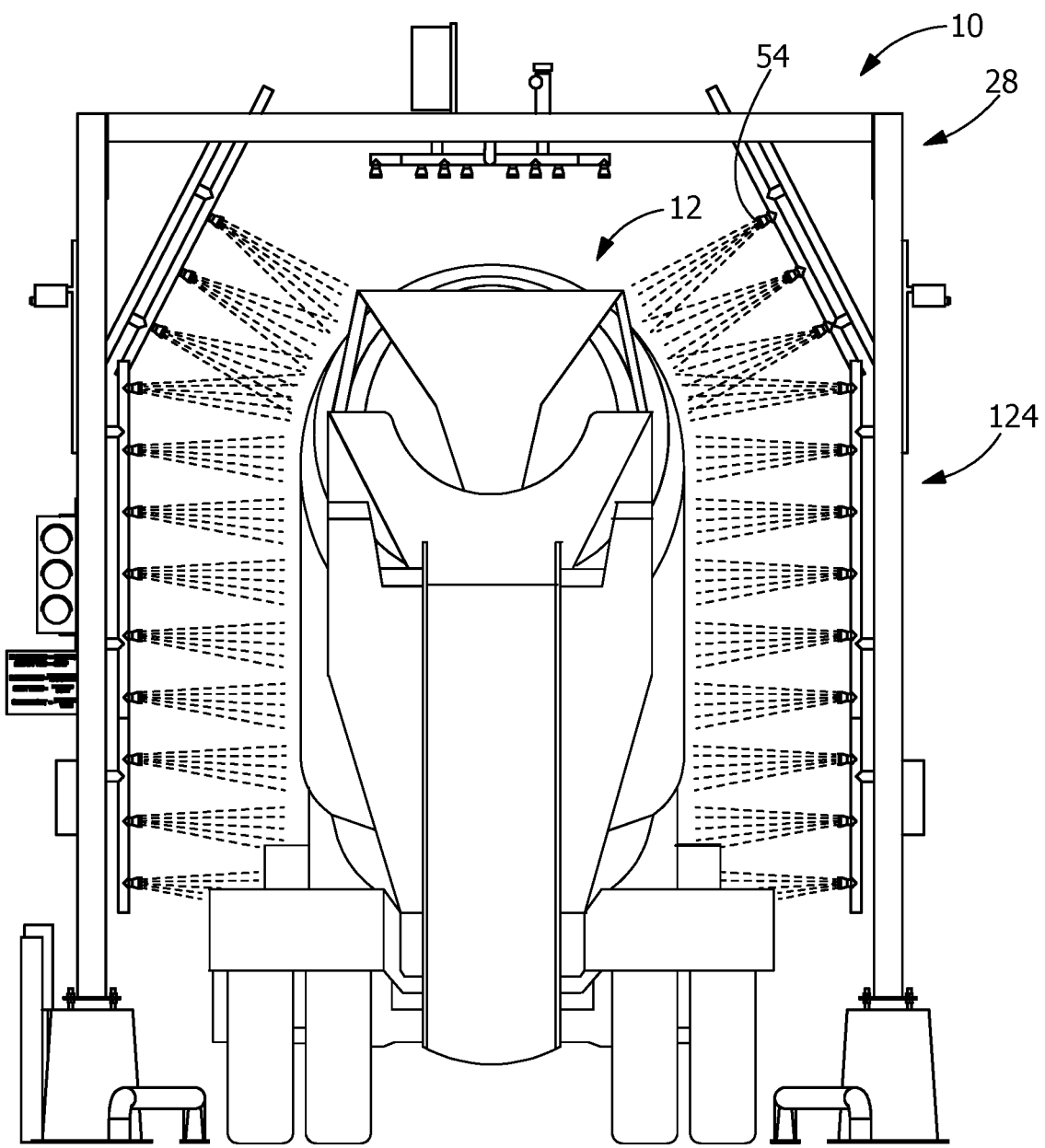
FIG. 6 is an end view of an exemplary stage of the ready mix truck wash system of FIG. 2.
Figure 7:
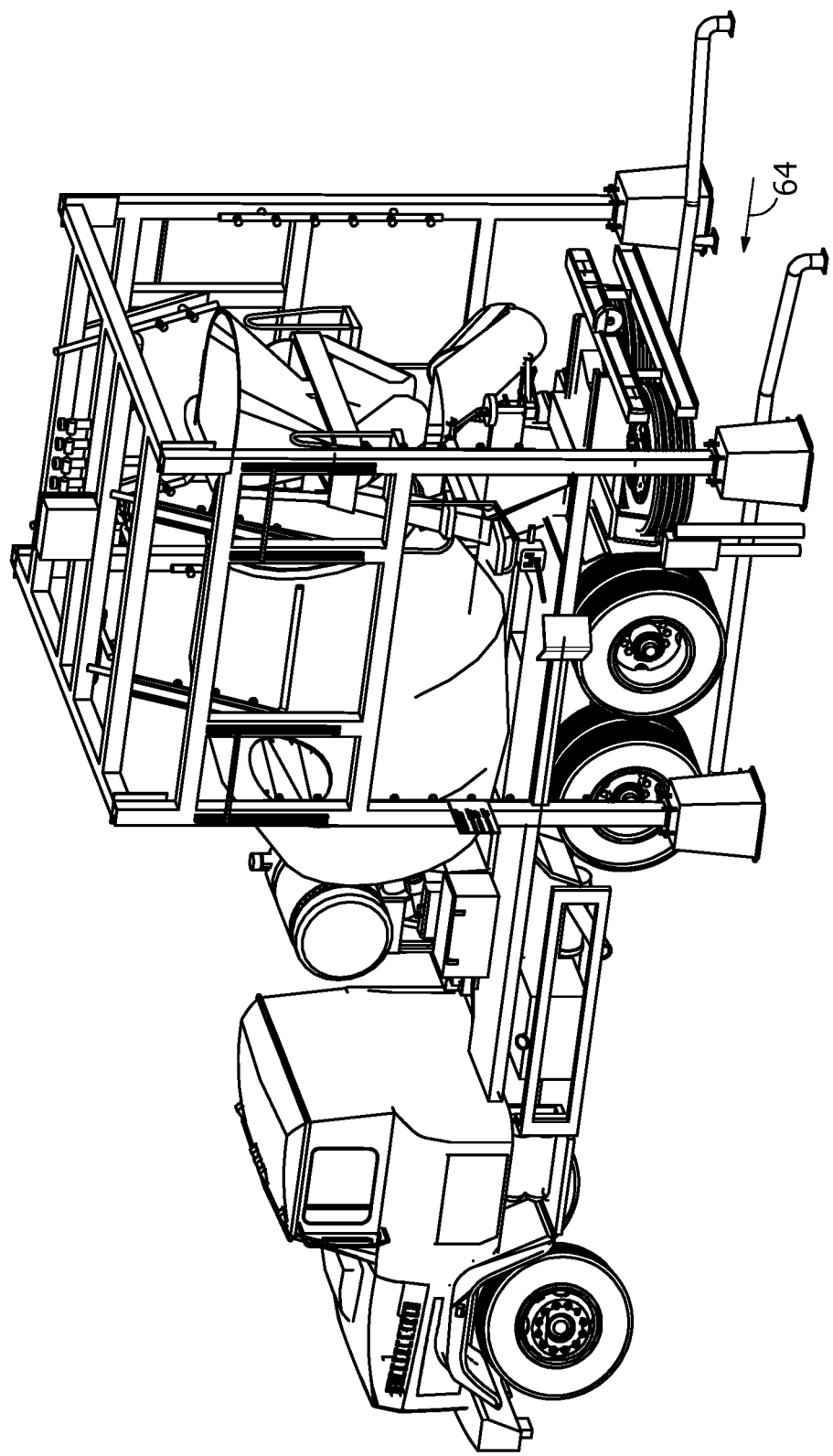
FIG. 7 is a perspective view of the stage of the ready mix truck wash system of FIG. 6.

Once the flow of pressurized water from second stage spray arch 120 is shut off, as shown in FIGS. 6-7, pressurized water from nozzles 54 forming a third stage spray arch 124 is initiated. Third stage spray arch 124 is applied to the outer surface of ready mix truck 12, primarily to the outer surface of barrel 26 or drum. At this time, the driver resumes travel of ready mix truck 12 in travel direction 64 away from ready mix truck wash system 10. Upon beams 78 (FIG. 8) of sensors 80 (FIG. 8) no longer being broken by ready mix truck 12, controller 86 (FIG. 10b) deactivates pump 70 (FIG. 10a) after a predetermined time period.

Figure 11:
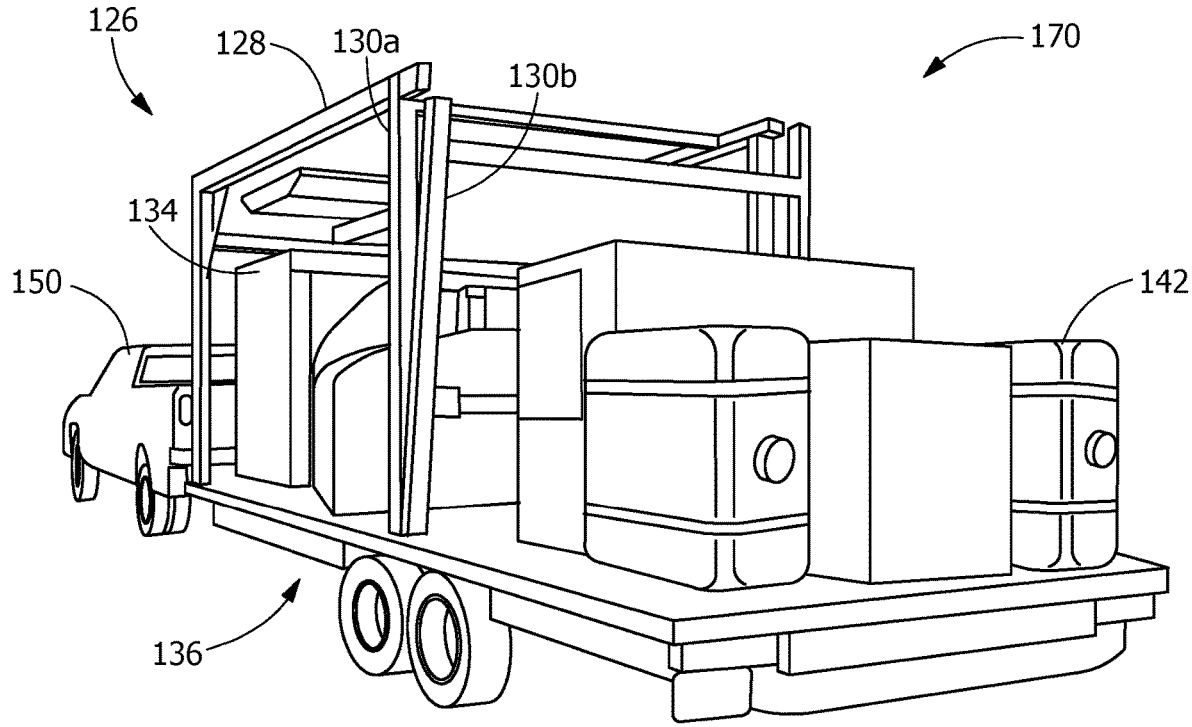
FIG. 11 is a perspective view of an exemplary ready mix truck wash system in a transport mode.
Figure 12:
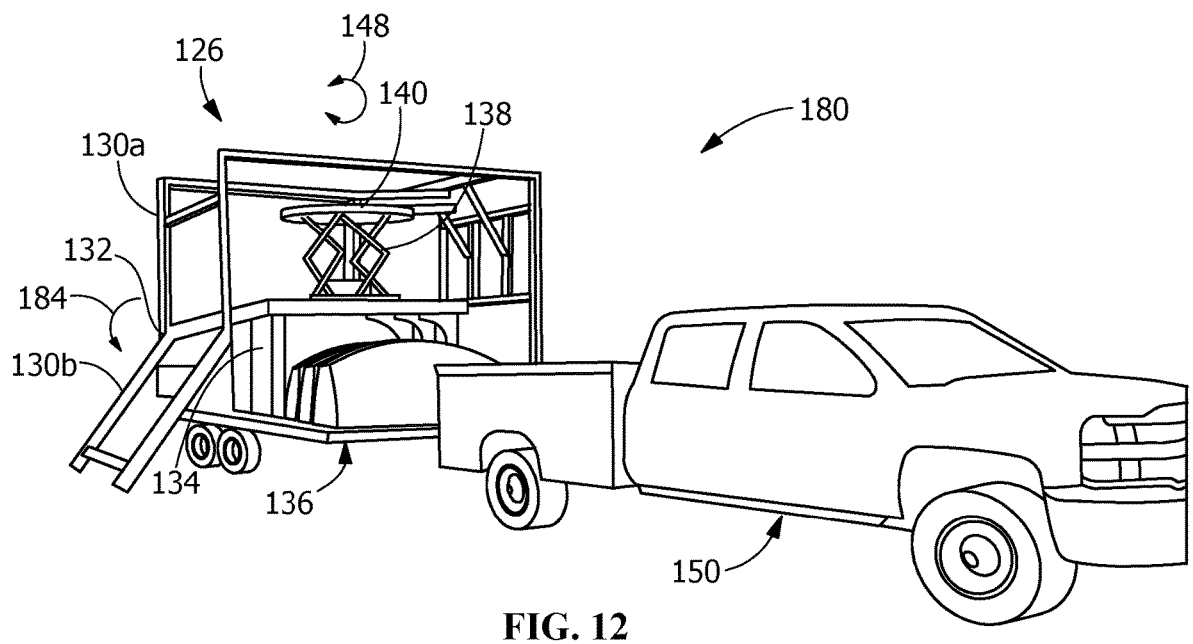
FIG. 12 is a perspective view of the ready mix truck wash system in an intermediate assembly position.
Figure 13:
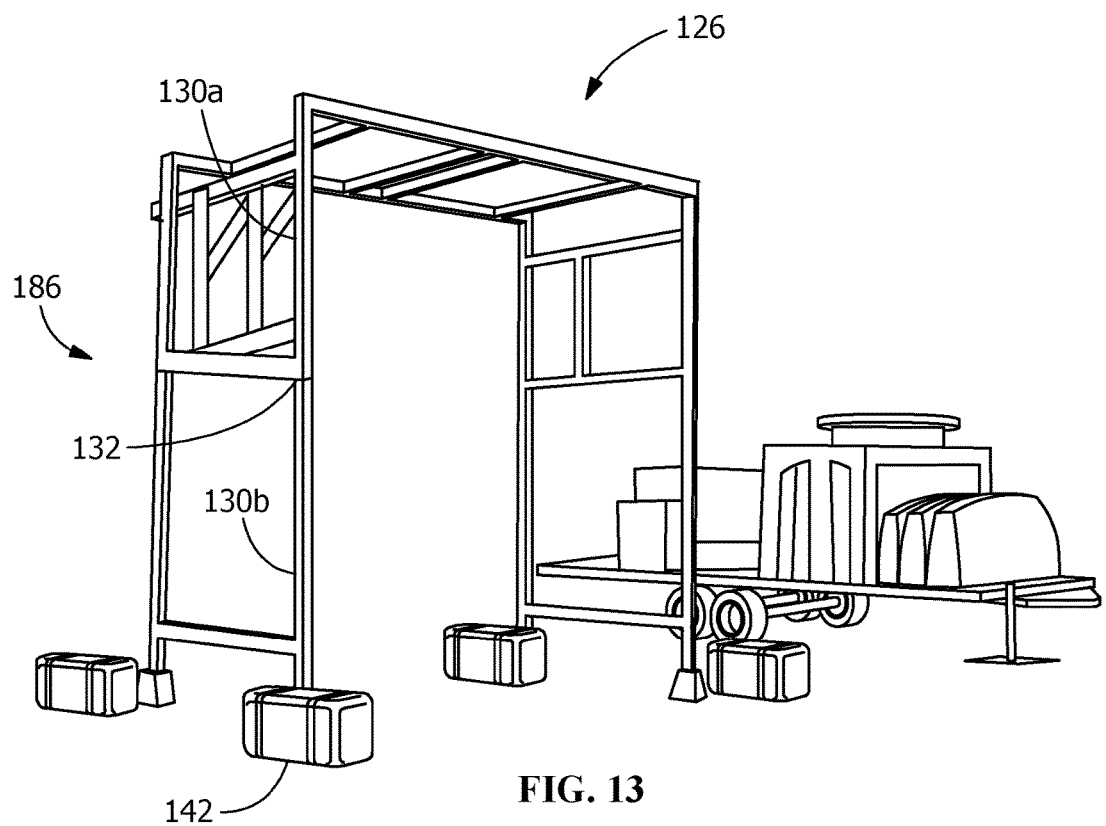
FIG. 13 is a perspective view of the ready mix truck wash system of FIG. 11 in an assembled position.
Figure 14:
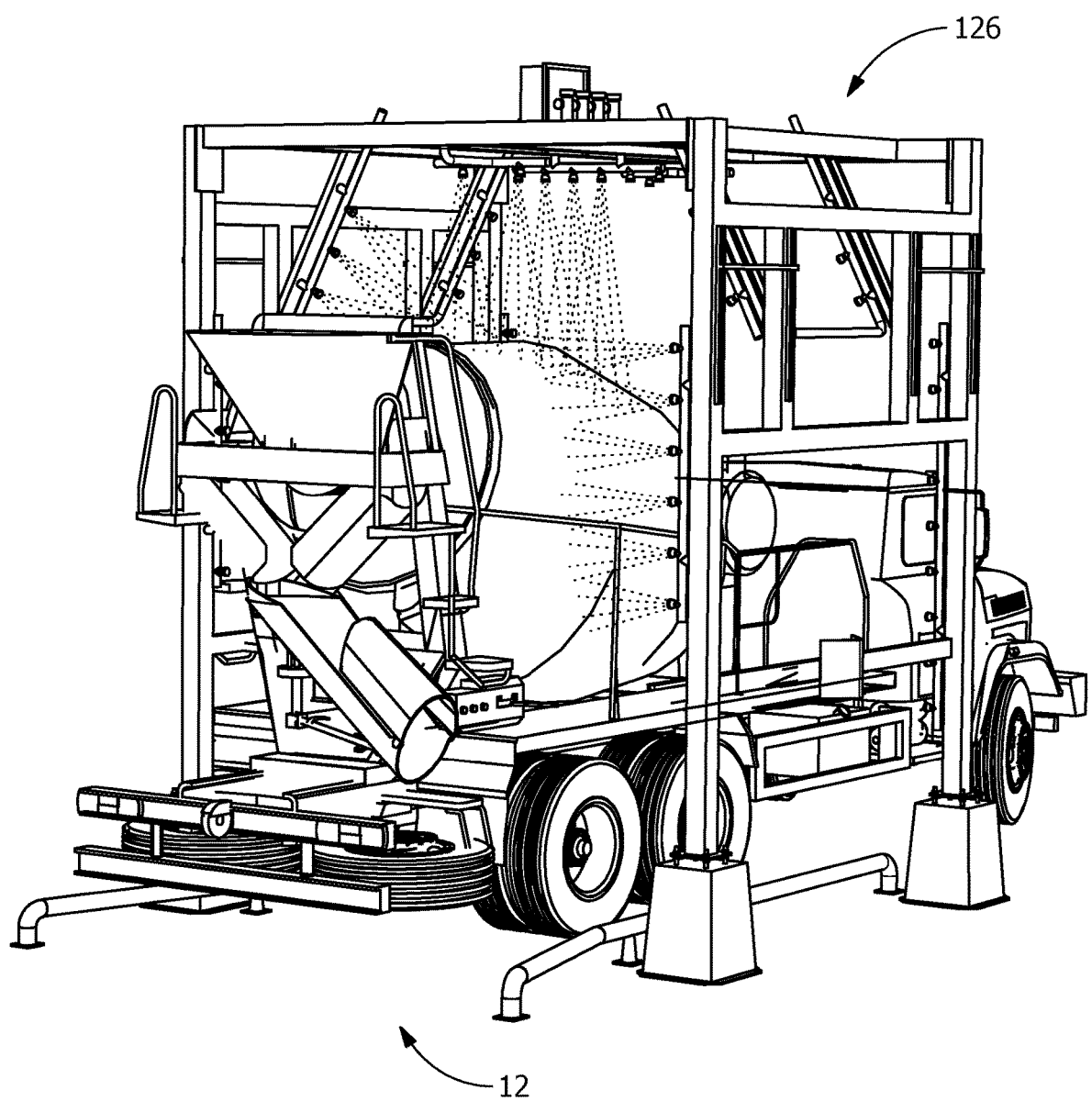
FIG. 14 a perspective view of an exemplary ready mix truck wash system of FIG. 11 in operation.

As shown in FIGS. 11-14 an embodiment of ready mix truck wash 126 adapted for rapid transportability between sites is now discussed. For brevity, components of frame 128 ready mix truck wash 126 that are different from frame 28 of ready mix truck wash system 10 are discussed. For example, each of vertically extending corresponding members 130a, 130b of frame 128 of ready mix truck wash 126 are pivotably connected by a pivot joint member 132, and as shown in FIG. 11, are positioned in a folded or retracted or collapsed position 182, with frame 128 of ready mix truck wash 126 being supported by a platform 134 secured to a trailer 136 pulled by a vehicle 150. As shown in FIG. 12, once ready mix truck wash 126 is positioned in a desired operational location, a lifting apparatus 138 such as a scissor lift positioned between platform 134 and frame 128 is actuated from a collapsed position to an extended position, thereby raising frame 128 relative to platform 134. Once lifting apparatus 138 has been raised to the extended position, a turntable 140 is unlocked to permit frame 128 to be rotated in rotational movement direction 148 approximately 90 degrees relative to trailer 136 between a frame transport position 170 (FIG. 11) and a frame installation position 180 (FIG. 12). Once frame 128 has been rotated relative to trailer 136, members 130a, 130b are each pivotably connected about respective pivot joint members 132 and urged into pivotal movement 184 (FIG. 12) from folded or retracted or collapsed position 182 to extended position 186 (FIG. 13), such as by gravity or with actuator control (not shown), locked in the extended position, and bases 142 are secured to the ends of each corresponding member 130b. In one embodiment, members 130a, 130b are telescoping, and do not rotate relative to one another between collapsed and extended positions. Subsequently, lifting apparatus 138 is actuated from the extended position to the collapsed position, thereby disconnecting frame 128 from lifting apparatus 138, permitting vehicle 150 to pull trailer 136 from beneath frame 128. Once modules 144, 146 are operably connected with frame 128, ready mix truck wash 126 is available for use such as shown in FIG. 14.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A ready mix truck wash system, comprising:
a frame adapted for receiving a ready mix truck during operation of the system;
a plurality of nozzles supported at predetermined positions by the frame to direct a pressurized liquid for washing the ready mix truck;
a controller; and
a plurality of sensors controlled by the controller for monitoring a position of the ready mix truck relative to at least one of the frame and the plurality of nozzles in preparation of operation and during operation of the system, wherein at least one of the plurality of sensors is movably positioned, relative to a support positioned on top of the frame, in vertical and horizontal axial directions and a rotational direction;
wherein at least one of the plurality of sensors is activated as a result of a beam being interrupted from an inside surface of a feed hopper of the ready mix truck; and
wherein in response to the ready mix truck being temporarily positioned at a first fixed position during operation of the system, a controlled predetermined volume of pressurized liquid is introduced into a barrel of the ready mix truck from at least one nozzle of the plurality of nozzles positioned on the top of the frame, the predetermined volume of pressurized liquid mixing with a concrete load in the ready mix truck.

2. The ready mix truck wash system of claim 1, wherein the frame is an inverted "U".

3. The ready mix truck wash system of claim 1 further comprises an indicator for indicating an operation status of the system.

4. The ready mix truck wash system of claim 3, wherein the indicator is a traffic light.

5. The ready mix truck wash system of claim 4 further comprising an instruction panel for instructing a driver of the ready mix truck in response to an indication from the indicator.

6. The ready mix truck wash system of claim 1, wherein the plurality of nozzles is arranged in a plurality of clusters, each cluster of the plurality of clusters is positioned in a plane.

7. The ready mix truck wash system of claim 6, wherein each plane is perpendicular to a travel direction of the ready mix truck during operation of the system.

8. The ready mix truck wash system of claim 6, wherein each cluster of the plurality of clusters defines a spray arch for washing the ready mix truck.

9. The ready mix truck wash system of claim 1, wherein corresponding members of the frame are movable between a collapsed position and an extended position.

10. The ready mix truck wash system of claim 9, wherein the corresponding members of the frame are rotatably movable between the collapsed position and the extended position.

11. The ready mix truck wash system of claim 9, wherein the corresponding members of the frame are telescopingly movable relative to one another between the collapsed position and the extended position.

12. The ready mix truck wash system of claim 1, wherein the plurality of sensors comprises at least one of an eddy-current, inductive, a magnetic proximity fuse, an optical photoelectric, a photocell, a laser, a passive charge-coupled device, a passive thermal infrared device, a radar, a reflection of ionizing radiation, a sonar (active or passive), an ultrasonic device, fiber optics, or Hall effect sensors.

13. The ready mix truck wash system of claim 1, wherein the controlled predetermined volume of pressurized liquid is 7.5 gallons plus/minus 0.5 gallons or less.

14. The ready mix truck system of claim 1, wherein the plurality of sensors are movable to adapt for operation with a predetermined model of the ready mix truck to be washed.

15. The ready mix truck system of claim 1, wherein the plurality of sensors operate to indicate a position of the ready mix truck at a first fixed position;
wherein with the ready mix truck at the first fixed position, a portion of nozzles of the plurality of nozzles are positioned in proximity of the feed hopper of the ready mix truck in preparation of directing pressurized liquid into the barrel of the ready mix truck.

16. A ready mix truck wash system, comprising:
a frame adapted for receiving a ready mix truck during operation of the system, the frame including a plurality of corresponding frame members movable between a collapsed position and an extended position;
a plurality of nozzles supported at predetermined positions by the frame to direct a pressurized liquid for washing the ready mix truck;
a controller;
a plurality of sensors controlled by the controller for monitoring a position of the ready mix truck relative to at least one of the frame and the plurality of nozzles in preparation of operation and during operation of the system, wherein at least one of the plurality of sensors is movably positioned, relative to a support positioned on top of the frame, in vertical and horizontal axial directions and a rotational direction;
wherein at least one of the plurality of sensors is activated as a result of a beam being interrupted from an inside surface of a feed hopper of the ready mix truck; and
wherein in response to the ready mix truck being temporarily positioned at a first fixed position during operation of the system, a controlled predetermined volume of pressurized liquid is introduced into a barrel of the ready mix truck from the plurality of nozzles positioned on the top of the frame, the predetermined volume of pressurized liquid mixing with a concrete load in the ready mix truck.

17. The ready mix truck wash system of claim 16 further comprises
a platform adapted to support the frame during transport of the system from a first location to a second location, the platform adapted to be pulled behind a vehicle with the plurality of corresponding frame members in a collapsed position;
the platform including a lifting apparatus movable between an extended position and a collapsed position connected to a turntable for rotating the frame about a vertical axis between a frame transport position and a frame installation position when the lifting apparatus is in the extended position.

18. The ready mix truck wash system of claim 16 further comprises a plurality of bases each adapted to receive one frame member of the plurality of the corresponding frame members.

19. The ready mix truck wash system of claim 16, wherein a lifting apparatus is a scissor lift.

\* \* \* \* \*